US007762821B2

(12) United States Patent
Patterson et al.

(10) Patent No.: US 7,762,821 B2
(45) Date of Patent: Jul. 27, 2010

(54) ELECTRIFIED CEILING FRAMEWORK

(75) Inventors: Brian T. Patterson, Lewisberry, PA (US); Sandor Frecska, Mannington, WV (US); Jere W. Myers, Washington Boro, PA (US)

(73) Assignee: Worthington Armstrong Venture, Malvern, PA (US)

( * ) Notice: Subject to any disclaimer, the term of this patent is extended or adjusted under 35 U.S.C. 154(b) by 786 days.

(21) Appl. No.: 11/581,855

(22) Filed: Oct. 17, 2006

(65) Prior Publication Data
US 2008/0087464 A1    Apr. 17, 2008

(51) Int. Cl.
*H01R 25/00*    (2006.01)
(52) U.S. Cl. ............................... 439/121; 362/147
(58) Field of Classification Search ......... 439/110–122; 174/70 C; 362/147, 150
See application file for complete search history.

(56) References Cited

U.S. PATENT DOCUMENTS

| 3,590,135 | A | * | 6/1971 | Herbenar et al. | 174/491 |
|---|---|---|---|---|---|
| 3,683,101 | A | | 8/1972 | Liberman | 174/49 |
| 3,781,567 | A | | 12/1973 | Papsco | 307/147 |
| 4,001,571 | A | | 1/1977 | Martin | 240/9 R |
| 4,109,305 | A | | 8/1978 | Claussen et al. | 362/418 |
| 4,414,617 | A | | 11/1983 | Galindo | 362/404 |
| 4,626,747 | A | | 12/1986 | Nilssen | 315/209 |
| 4,631,648 | A | | 12/1986 | Nilssen | 362/150 |
| 4,667,133 | A | | 5/1987 | Nilssen | 315/312 |
| 4,822,292 | A | | 4/1989 | Thayer et al. | 439/207 |
| 5,397,238 | A | * | 3/1995 | Och | 439/39 |
| 5,455,754 | A | | 10/1995 | Hoffner | 362/250 |
| 5,479,326 | A | | 12/1995 | Nilssen | 362/148 |
| 6,070,995 | A | | 6/2000 | Kanai | 362/365 |
| 6,179,451 | B1 | | 1/2001 | Bodine et al. | 362/404 |
| 6,244,733 | B1 | * | 6/2001 | Fong et al. | 362/391 |
| 6,260,981 | B1 | | 7/2001 | Fiene | 362/147 |
| 6,435,693 | B1 | | 8/2002 | Fiene | 362/147 |
| 6,439,736 | B1 | | 8/2002 | Fiene | 362/147 |
| 6,508,567 | B1 | | 1/2003 | Fiene | 362/147 |
| 6,540,372 | B2 | * | 4/2003 | Joseph | 362/147 |
| 6,540,373 | B2 | | 4/2003 | Bailey | 362/150 |
| 6,585,529 | B2 | | 7/2003 | Zakerzewski | 439/110 |
| 6,764,196 | B2 | | 7/2004 | Bailey | 362/147 |
| 6,827,592 | B2 | | 12/2004 | McCoy et al. | 439/188 |
| 6,860,617 | B2 | | 3/2005 | Fiene | 362/147 |
| 6,869,209 | B2 | | 3/2005 | Layne et al. | 362/404 |
| 7,108,392 | B2 | * | 9/2006 | Strip et al. | 362/145 |
| 7,455,535 | B2 | * | 11/2008 | Insalaco et al. | 439/121 |
| 2002/0109984 | A1 | * | 8/2002 | Bischel et al. | 362/150 |
| 2002/0141181 | A1 | | 10/2002 | Bailey | 362/150 |
| 2003/0002279 | A1 | | 1/2003 | Fiene | 362/147 |
| 2003/0021116 | A1 | | 1/2003 | Miller et al. | 362/249 |
| 2003/0036306 | A1 | | 2/2003 | McCoy et al. | 439/502 |
| 2003/0081410 | A1 | | 5/2003 | Bailey | 362/147 |
| 2006/0067089 | A1 | | 3/2006 | Hocquard et al. | 362/576 |
| 2006/0262521 | A1 | | 11/2006 | Piepgras et al. | 362/149 |

FOREIGN PATENT DOCUMENTS

EP    0793056 A2    3/1997

* cited by examiner

*Primary Examiner*—Michael C Zarroli

(57) ABSTRACT

An electrified ceiling framework system having a plurality of grid elements forming a grid network arranged in a substantially planar arrangement. A conductive material is disposed on a surface of at least one of the plurality of grid elements. The conductive material is electrically connected to a low voltage power source and has a contact surface connectable to a low voltage device.

10 Claims, 8 Drawing Sheets

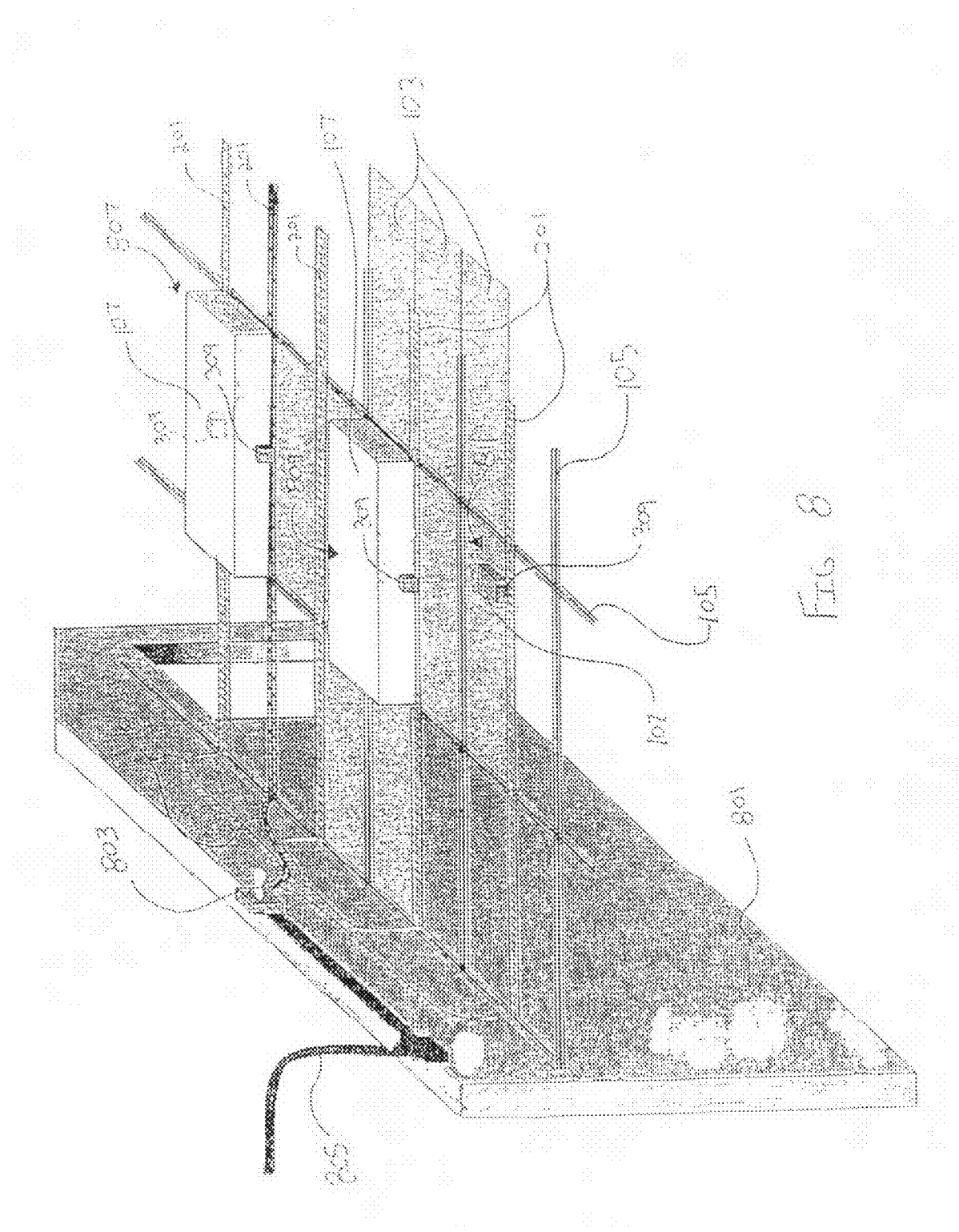

ELECTRIFIED CEILING FRAMEWORK

FIELD OF THE INVENTION

The present invention is directed to ceiling grid frameworks. Specifically, the present invention is directed to electrified ceiling grid frameworks for connection to low voltage devices.

BACKGROUND OF THE INVENTION

The electrical grid connecting America's power plants, transmission lines and substations to homes, businesses and factories operate almost entirely within the realm of high voltage alternating current (AC). Yet, an increasing fraction of devices found in those buildings actually operate on low voltage direct current (DC). Those devices include, but are not limited to, digital displays, remote controls, touch-sensitive controls, transmitters, receivers, timers, light emitting diodes (LEDs), audio amplifiers, microprocessors, other digital electronics and virtually all products utilizing rechargeable or disposable batteries.

Installation of devices utilizing low voltage DC has been typically limited to locations in which either a pair of wires carrying high voltage AC are routed to the device that has a self-contained ability to convert the AC power to a useful form of low voltage DC power or where a pair of wires are routed from a separate source of useful low voltage DC power. Increased versatility in placement and powering of low voltage DC components is desirable. Specifically, there is an increasing desire to have electrical functionality, such as power and signal transmission, in the ceiling environment without the drawbacks of known ceiling systems, including the drawback of pair wiring from the voltage source.

A conventional ceiling grid framework includes main grid elements running the length of the ceiling with cross grid elements therebetween. The main and cross elements form the ceiling into a grid of polygonal openings into which function devices, such as ceiling tiles, light fixtures, speakers, motion detectors and the like can be inserted and supported. The grid framework and ceiling tile system may provide a visual barrier between the living or working space and the infrastructure systems mounted overhead.

Known systems that provide electrification to ceiling devices, such as lighting, utilize a means of routing wires, principally on an "as needed" point-to-point basis via conduits, cable trays and electrical junctions located in or about the plenum space above the ceiling grid framework. These known systems suffer from the drawback that the network of wires required occupy the limited space above the ceiling grid, and are difficult to service or reconfigure. Moreover, the techniques currently used are limited in that the electricity that is provided to the ceiling environment is not reasonably accessible from all directions relative to the ceiling plane. In other words, electricity can be easily accessed from the plenum, but not from areas within or below the plane of the grid framework. Further, the electrical power levels that are typically available are not safe for those not trained, licensed and/or certified in the practice to work with.

What is needed is a ceiling system that provides electrical functionality to the ceiling grid framework without the drawbacks of known ceiling systems. The present invention accomplishes these needs and provides additional advantages.

SUMMARY OF THE INVENTION

One aspect of the invention includes an electrified ceiling framework system having a plurality of grid elements forming a grid network. A conductive material is disposed on a surface of at least one of the plurality of grid elements. The conductive material is electrically connected to one or a plurality of low voltage power sources and has a contact surface connectable to one or a plurality of low voltage devices.

Another aspect of the invention includes a method of powering a low voltage device mounted in a room space. The method includes providing an electrified ceiling framework system having a plurality of grid elements forming an overhead grid network in a room space. The room space shall include but not be limited to the space adjacent to and above the ceiling framework, the space within the plane of the ceiling framework and the space adjacent to and below the ceiling framework. A conductive material is disposed on a surface of at least one of the plurality of grid elements. The conductive material is electrically connected to one or a plurality of low voltage power sources. One or a plurality of low voltage device is placed in the room space and is electrically connected to the conductive material.

An advantage of an embodiment of the present invention includes the easily customizable configuration of low voltage devices and power sources above, within or below the ceiling.

Another advantage of an embodiment of the present invention is the ability to provide connections to a variety of electrical devices within the ceiling without the need for extensive wiring.

Still another advantage of the present invention is that a variety of low voltage electrical devices may be safely and conveniently connected to or unconnected from the electrified ceiling framework while the source of low voltage power remains on and connected to the conductive material of the framework.

Still another advantage of the present invention is that all or a portion of the system may be fabricated during the manufacture of the support members or may be retrofitted to installed support members.

Still another advantage of the present invention is that the system utilizes low voltage technology providing the ability to power electrical, electronic or other electro-active devices without the need to convert the power from AC to DC for each device.

Still another advantage of the present invention is that the low voltage power transmitted through the conductive material of the electrified ceiling framework may be conveniently routed in alternate pathway configurations by means of placing either non-switchable or switchable non-conductive or conductive interconnecting shunt devices at one or a plurality of junctions points of said conductive material within said framework.

Still another advantage of the present invention is that one or a plurality of the electrical devices connected to the conductive material of the electrified ceiling framework may be controlled, monitored, or otherwise communicated with via a wireless signaling means wherein at least one transmitter, receiver or transceiver element in the communication link is powered by being connected to the conductive material of the electrified ceiling framework, thus further reducing wiring and/or the use of batteries or similar discrete power means that would otherwise be needed.

Still another advantage of the present invention is that one or a plurality of the electrical devices connected to the conductive material of the electrified ceiling framework may be designed to operate in one or a plurality of different operational modes based on controlled or uncontrolled changes in the level of power available, for example, as may be occasioned by the purposeful or accidental loss or reduction of power from one or a plurality of the system's low voltage power sources.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 shows a perspective view of a grid framework system according to another embodiment of the present invention.

Wherever possible, the same reference numbers are used throughout the drawings to refer to the same or like parts.

DETAILED DESCRIPTION OF THE INVENTION

Figure 1:
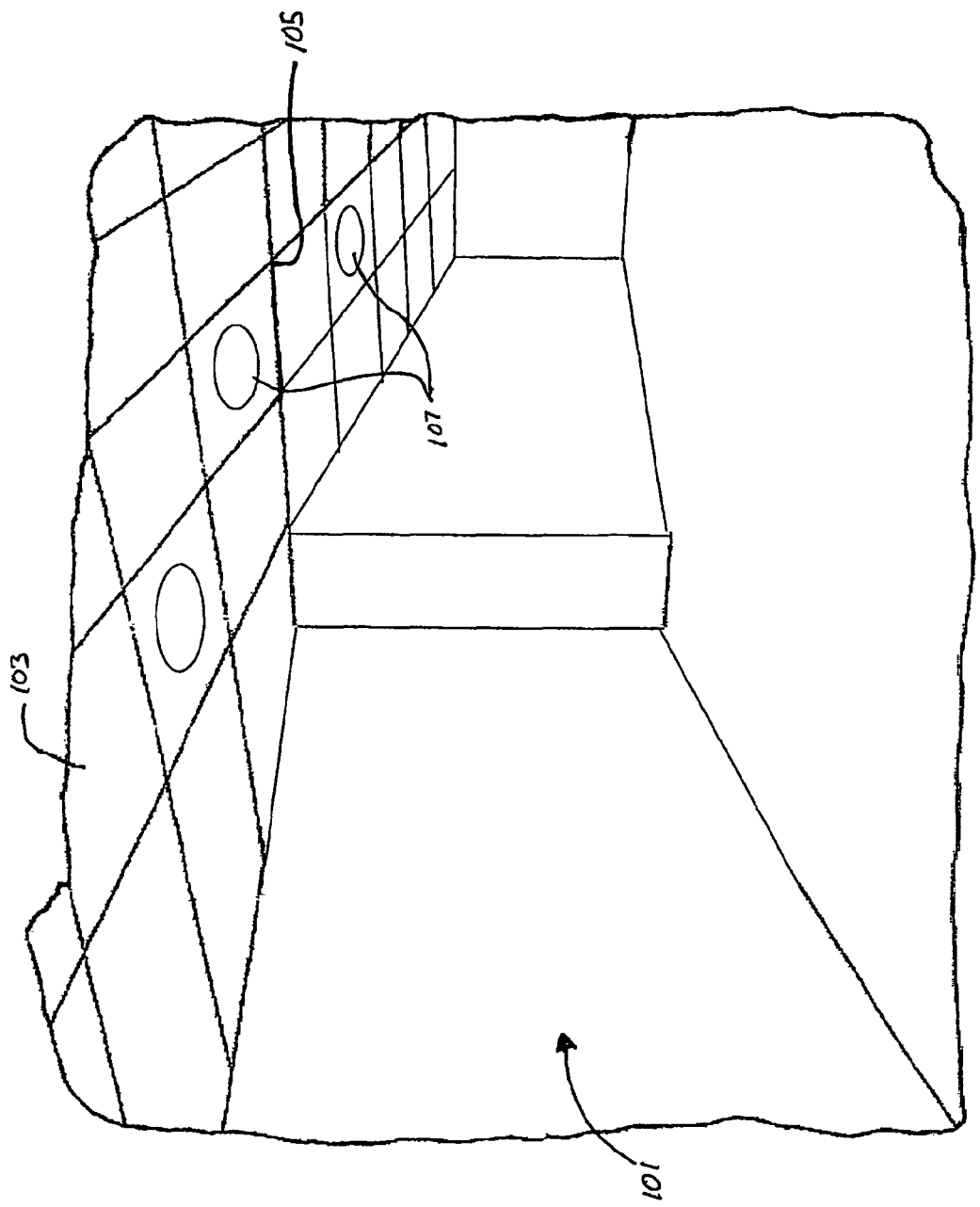
FIG. 1 shows an elevational perspective view of a room space having an electrified ceiling according to an embodiment of the present invention.

The present invention includes an electrified ceiling framework. In particular, the present invention includes a framework, preferably mounted onto the structural overhead of a room space 101, that is capable of providing power to low voltage devices 107. FIG. 1 shows a room space 101 having a ceiling 103 supported by a ceiling grid framework 105. The ceiling 103 may include decorative tiles, acoustical tiles, insulative tiles, lights, heating ventilation and air conditioning (HVAC) vents, other ceiling elements or covers and combinations thereof. Low voltage devices 107 include, but are not limited to decorative devices, lighting devices, such as incandescent lights, fluorescent lights, light emitting diode (LED) lights, organic light emitting diode (OLED) lights, polymer light emitting diodes, electroluminescent lights, acoustical devices, such as speakers, heating or cooling devices, such as electrically actuated mechanical devices (i.e. variable air velocity diffusers), sensor and/or control devices, such as smoke or carbon monoxide detectors, other air quality sensing devices, electronic motion detectors, wireless access points or antenna, communication devices, life safety and health maintenance devices, audio-visual devices, such as still or video cameras, electronic display or image producing devices and/or other electrical or electronic low voltage devices. These low voltage devices 107 may be mounted within, above or below ceiling 103. Power for the low voltage devices 107 is provided by conductors 201 (see FIG. 2) placed upon surfaces of the ceiling grid framework 105.

Figure 2:
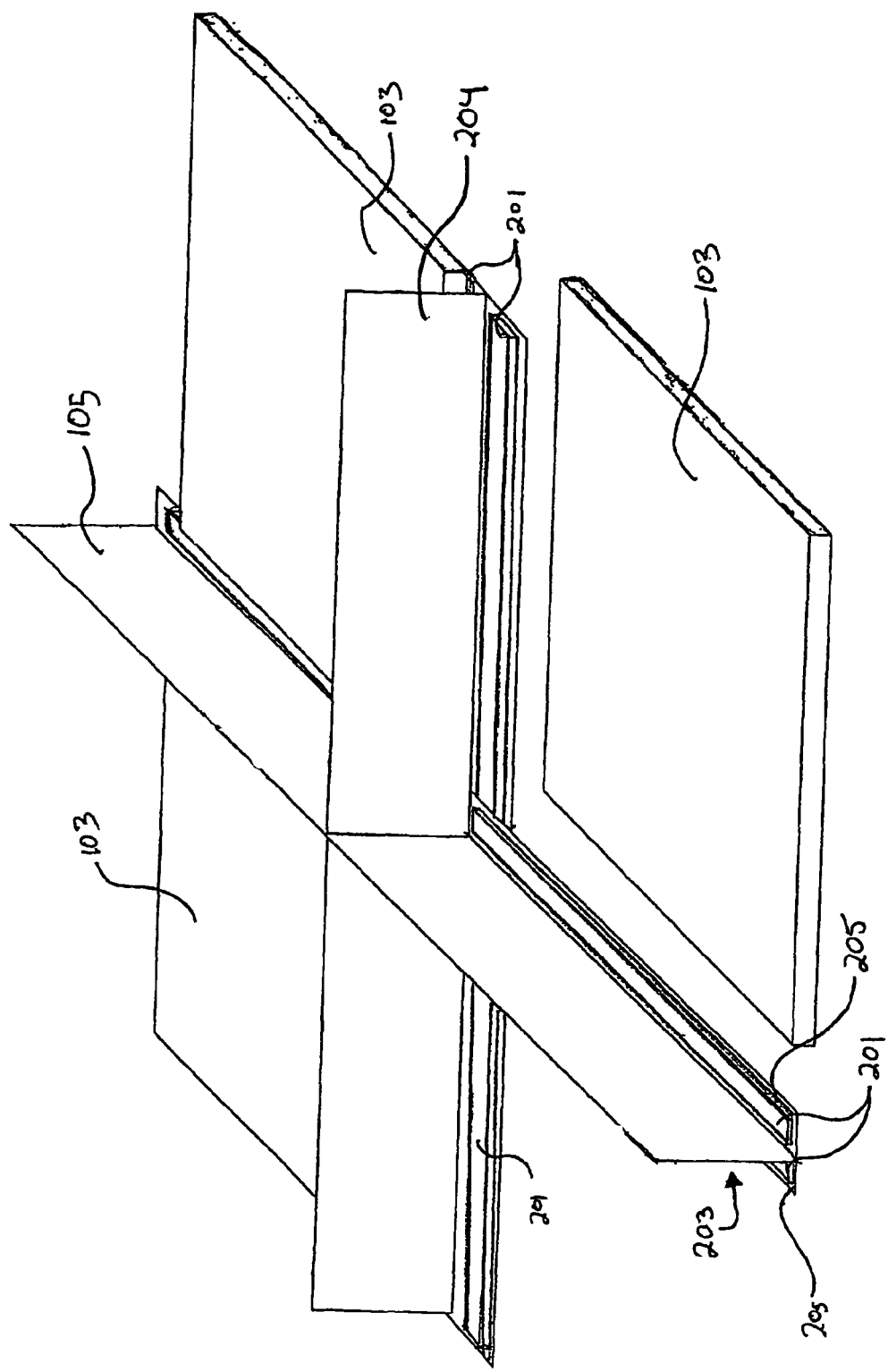
FIG. 2 shows a perspective view of a section of grid framework according to an embodiment of the present invention.

FIG. 2 shows a perspective view of a segment of the ceiling grid framework 105 viewed from above with a portion of the ceiling 103 removed. The ceiling grid framework 103 includes intersecting support members 203 having a cross-section having a substantially inverted "T" geometry, wherein flanges 304 extend outward from webbing 204. Webbing 204 extends from a bulb 301 (not shown in FIG. 2) or other supporting device to the flange 304. Although FIG. 2 shows an inverted "T" geometry, any geometry capable of either supporting ceiling 103 or providing a suitable ceiling decoration may be used. The support members 203 are mounted to the building structure by use of mechanical wires or other suitable support device connected by webbing 204 to the building structure (not shown in FIG. 2). Conductors 201 are mounted onto flange surfaces 205 of flange 304. While the conductors 201 are shown mounted on flange surfaces 205, the conductors 201 may be mounted on any surfaces or within any cavities formed in or by the grid framework that may be electrically connected to electrical devices, including, but not limited to, the vertical surfaces of webbing 204 and the lower surfaces of flanges 304 opposite the flange surfaces 205. The conductors 201 comprise a conductive material that, when contacted, provides an electrical connection that is sufficient to power a low voltage electrical device. Suitable conductive materials include, but are not limited to, aluminum and its alloys, copper and its alloys, brass, phosphor bronze, beryllium copper, stainless steel, or other conductive material or combinations thereof. In addition, conductive materials may include a conductive body material having a plating including, but not limited to, nickel, tin, lead, bismuth, silver, gold plating or other conductive material plating or combination thereof.

As shown in FIG. 2, suitable surfaces for receiving conductors 201 include two flange surfaces 205 of the support member 203, wherein one of the flange surfaces 205 receives a conductor 201 having a positive charge and the second flange surface 205 receives a conductor 201 having a negative charge. In an alternate embodiment of the invention, a single positively charged conductor 201 may be provided, wherein a circuit may be completed by a device in connection with ground or otherwise suitable electrical return path. The conductors 201 may be exposed or may be partially or fully coated by an insulative or protective covering. The conductors 201 may be mounted onto, formed on, or otherwise included as part of the ceiling grid framework 105 by any suitable method, including, but not limited to, adhesive, plating or mechanical connection means. In addition, the conductors 201 may be mounted or formed directly onto the surface of the ceiling grid framework 105 or may have insulating material, such as MYLAR®, between the conductors 201 and the ceiling grid framework 105. MYLAR® is a federally registered trademark of E. I. Du Pont De Nemours and Company Corporation, Wilmington, Del., having a polyester composition that is well known in the art. Ceiling 103 may include conventionally available components, such as ceiling tiles that may be placed directly onto the conductors 201. In a preferred embodiment, the ceiling 103 includes ceiling tiles fabricated from a non-conductive material and may be placed directly onto the conductors 201.

In another embodiment of the invention, the conductors 201 may be at least partially coated with a material capable of resisting or slowing the effects of corrosion and dirt or dust. In another embodiment of the invention, the conductor may be embedded into the support member 203. In order to facilitate electrical contact, the coating material of this embodiment of the invention may be electrically conductive or may be pierceable by the contact with the contact member 317 to facilitate contact with the conductor 201 or may be pierceable or partially or fully removable by another suitable means.

Figure 3:
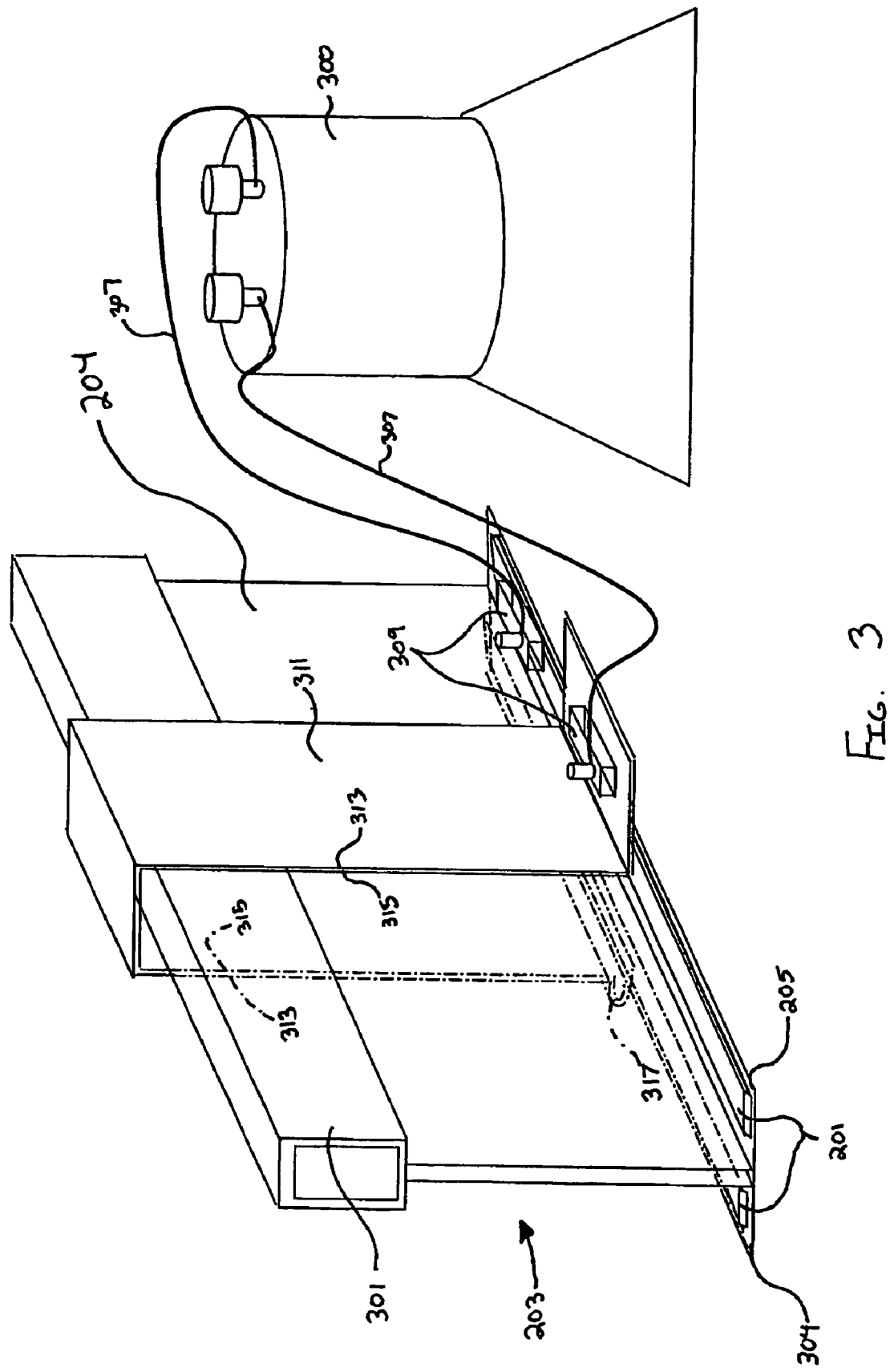
FIG. 3 shows an elevational perspective view of a connector arrangement in connection with a low voltage device according to the present invention.

FIG. 3 shows perspective elevational view of a portion of a support member 203 electrically connected to an electrical device 300. The support member 203 in FIG. 3 includes an upper box or bulb 301 and a flange 304, which includes lower flange surfaces 205. Electrical device 300 is powered by a pair of wires or other suitably conductive means 307 in electrical contact with conductors 201 by way of component connectors 309 and support connector 311. Electrical device 300 may be any electrical device that can be powered by the electricity provided by conductors 201. The electrical device 300 is preferably a low voltage device, such as digital displays, remote controls, touch-sensitive controls, transmitters, receivers, timers, LEDs, OLEDs, audio amplifiers, microprocessors, and virtually any product utilizing rechargeable batteries or any other low voltage devices previously mentioned.

Support connector 311 includes a conductive outer surface 313 and an insulative inner surface 315. The outer surface 313 may be covered with an insulating material, i.e. an insulated outer surface. Suitable conductive materials include, but are not limited to, aluminum, copper, brass, phosphor bronze, beryllium copper, stainless steel, or other conductive material or combinations thereof. In addition, conductive materials may include a conductive body material having a plating including, but not limited to, nickel, tin, lead, bismuth, silver, gold plating or other conductive material plating or combination thereof. The inner surface 315 may include an insulative material such as MYLAR®. Additional suitable insulative materials include, but are not limited to, polyester, acrylic, polyurethane, polyvinyl, silicone, epoxy, or other insulative compositions, or combinations thereof.

Support connector 311 includes a mechanically biased contact member 317. By mechanically biased, it is meant that the contact member 317 configured to provide continuous physical contact between the outer surface 313 of support connector 311 and conductor 201 via elasticity of the material, material memory, by weight of the support connector 311, or by any other force providing means in order to contact and retain contact with the conductor 201. Alternately, a portion of the outer surface of connector 311 may be coated or otherwise covered with an insulating material. Component connectors 309 provide an electrical connection via a physical contact between a conductive member in electrical communication with wire 307 and either or both of conductor 201 and the conductive outer surface of support connector 311. The component connector 309 may include any connector, whether mechanical or metallurgical, capable of providing electrical contact between the outer surface 313 and wire 307 and may include clips, plugs, screws, solder or any other known electrical connection. While FIG. 3 shows a support connector 311, the circuit for the electrical device 300 may be completed in any suitable fashion. For example, intersecting support members 203 (see e.g., FIG. 2), may power devices mounted on or in ceiling tiles having connections on adjacent sides of the ceiling tile.

Figure 4:
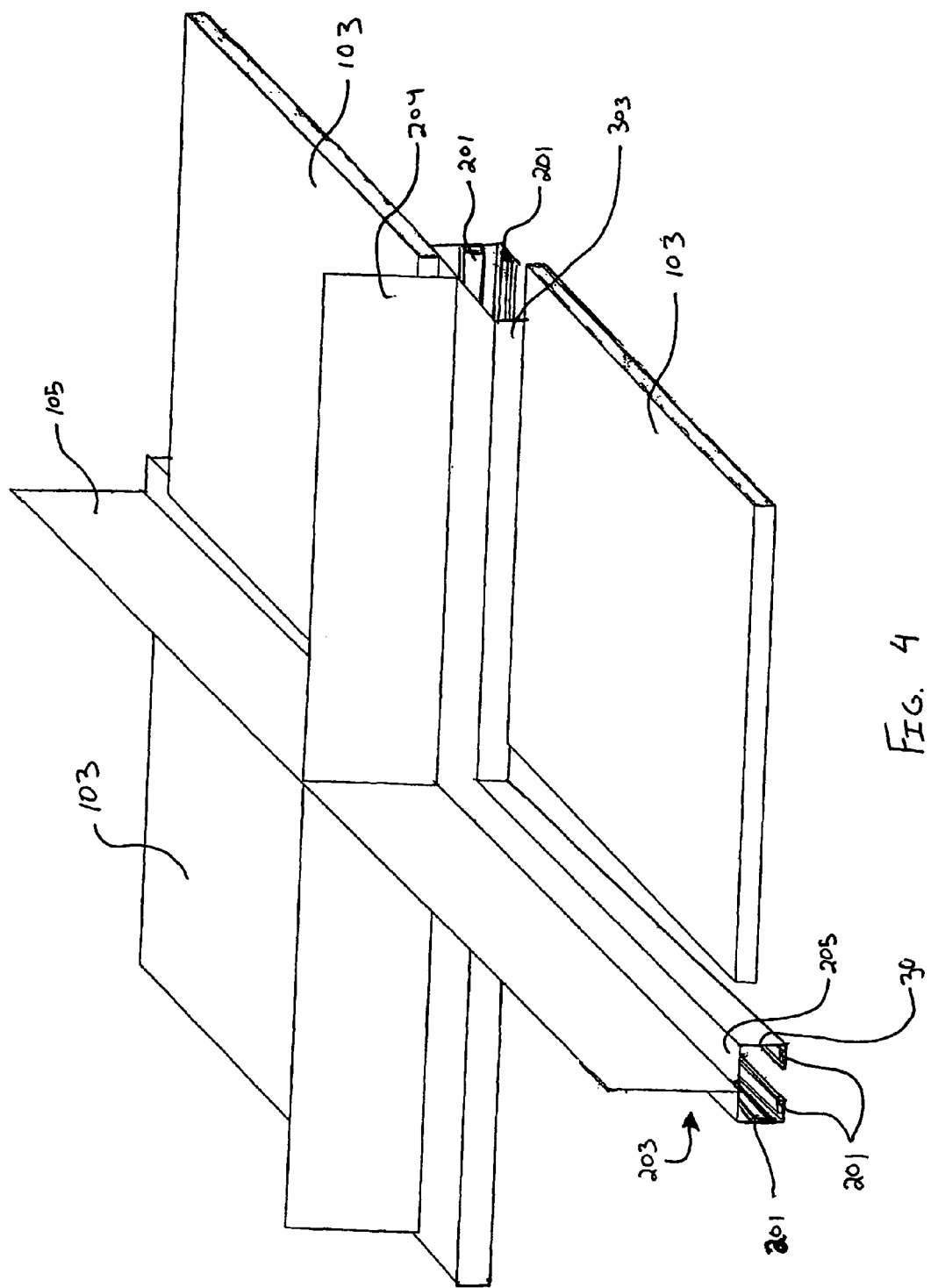
FIG. 4 shows a perspective view of a section of grid framework according to another embodiment of the present invention.

FIG. 4 shows a perspective view of a segment of the ceiling grid framework 105 viewed from above with a portion of the ceiling 103 having the arrangement shown in FIG. 2. However, the ceiling grid framework 105 of FIG. 4 includes intersecting support members 203 having an alternate geometry for flange 304 of FIG. 2. In FIG. 4, the webbing 204 extends from a bulb 301 (not shown in FIG. 4) or other support member to a lower box 303. The geometry of lower box 303 is not limited to the geometry shown and may be any geometry useful for supporting ceiling panels 103 or providing a suitable ceiling decoration and for providing a means into or onto which conductors 201 may be placed. The lower box 303 includes a plurality of conductors 201 arranged and disposed on surfaces within the lower box 303. The conductors 201 are not limited to the configuration shown in FIG. 4 and may be located on any surface of support member 203 or within any cavities formed in or by the grid framework. The arrangement of conductors 201 in FIG. 4 permits connections to electrical devices 300 below the ceiling grid framework 105.

Figure 5:
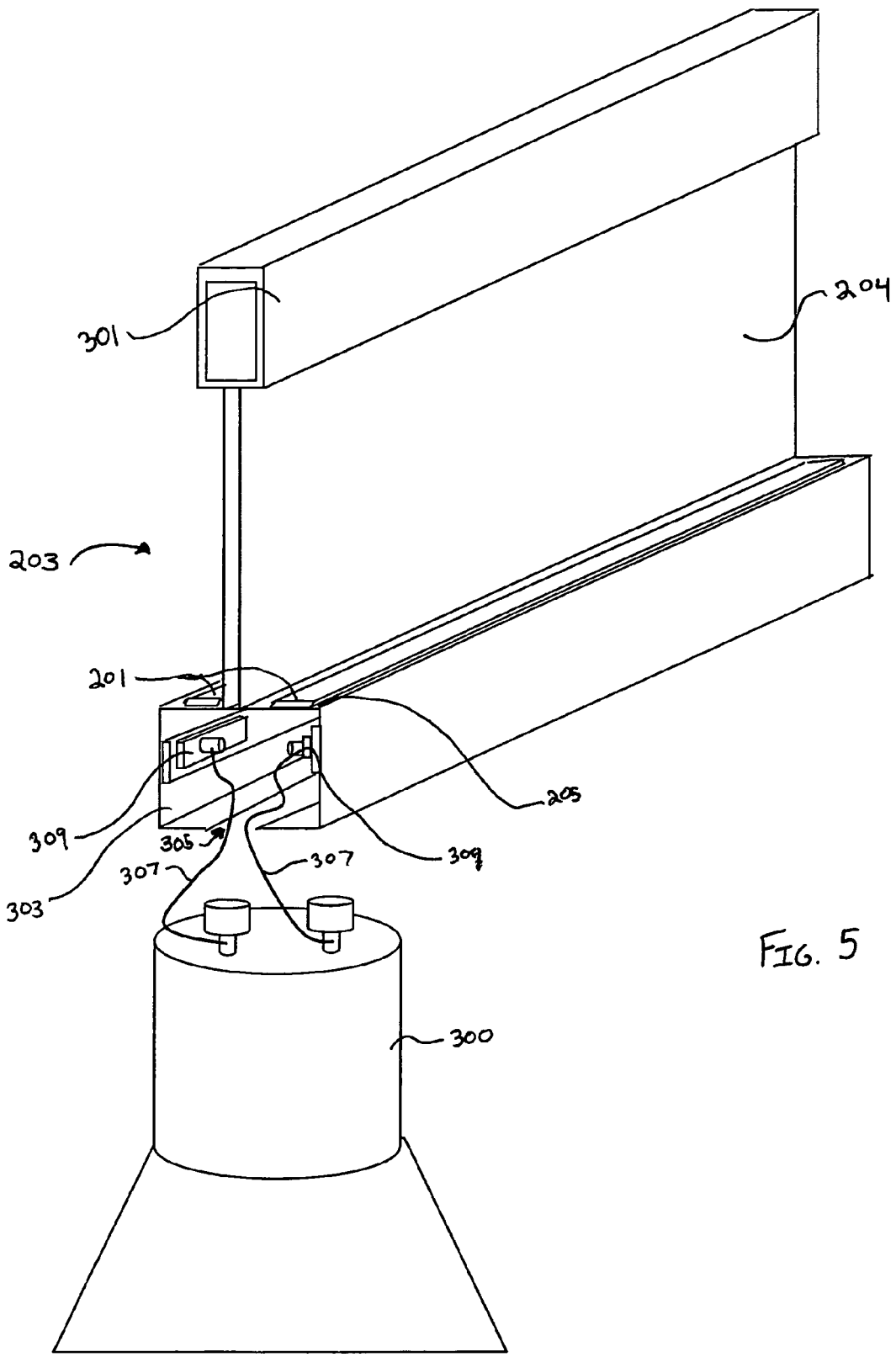
FIG. 5 shows an elevational perspective view of a connector arrangement in connection with a low voltage device according to another embodiment of the present invention.

FIG. 5 shows a perspective elevational view of a support member 203 electrically connected to an electrical device 300 and arranged below the ceiling grid framework 105. As in the support member 203 in FIG. 3, the support member 203 includes a bulb 301 and lower flange surfaces 205. However, in addition, the support member 203 includes a lower box 303. The lower box 303 includes an opening 305 and additional surfaces onto which conductors 201 may be mounted. Although FIG. 5 shows two conductors in lower box 303 along the vertical walls, additional conductors 201 may be present and may be mounted on any of the surfaces within or on the exterior of lower box 303. Although FIG. 5 shows the electrical connection to the electrical device being provided within lower box 303, the electrical connection may take place using any combination of connectors that complete an electrical circuit to power electrical device 300. For example, the electrical device 300 may be connected to a conductor 201 of positive polarity on lower flange surface 205 and conductor 201 of negative polarity conductor in lower box 303. In an alternate embodiment, one or more conductors 201 may be provided with a positive polarity wherein the electrical device 300 is attached to ground or other suitable electrical return path.

Figure 6:
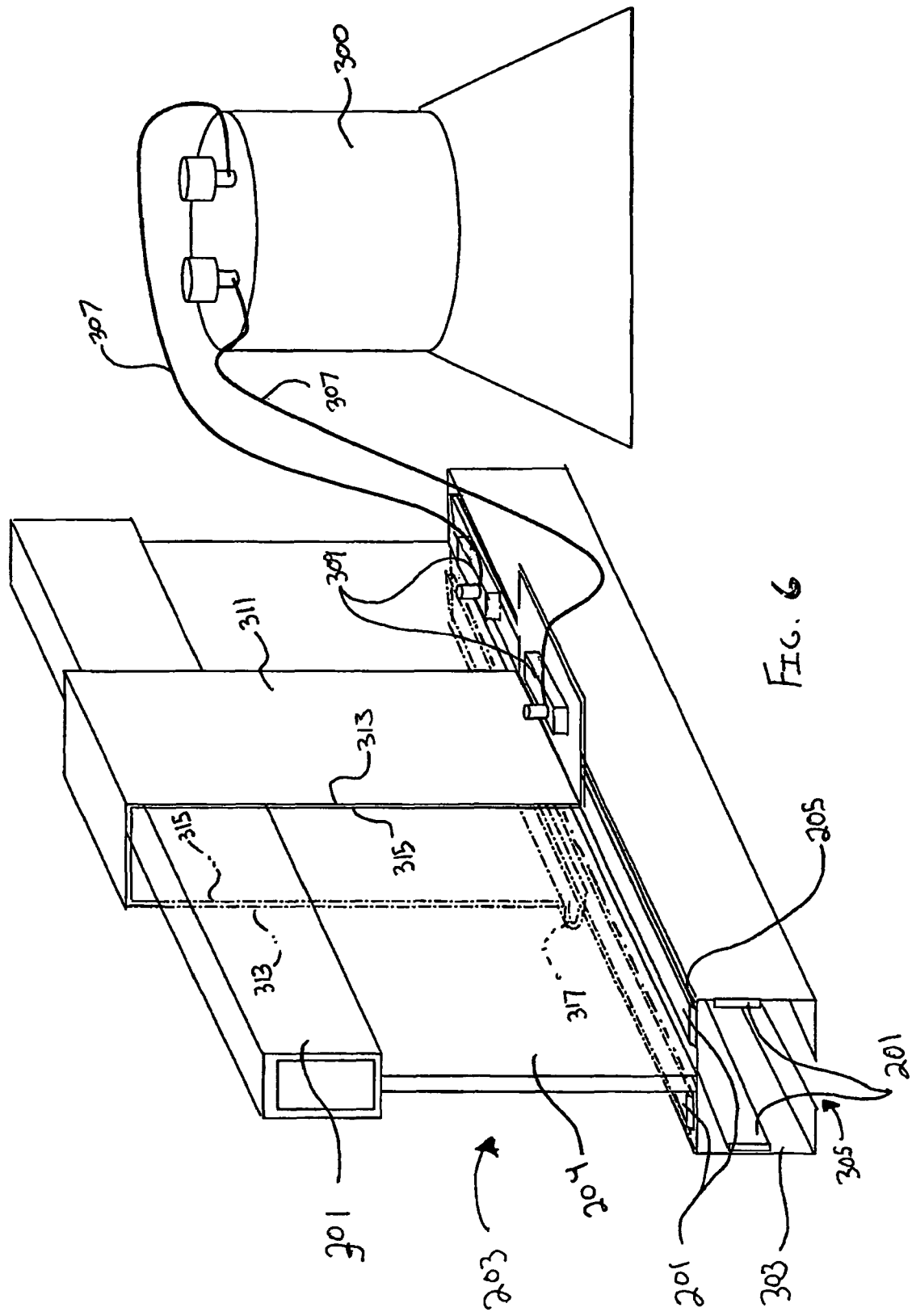
FIG. 6 shows an elevational perspective view of a connector arrangement in connection with a low voltage device according to another embodiment of the present invention.

FIG. 6 shows a perspective view of a support member 203 having the arrangement shown and described with respect to FIG. 5 electrically connected to an electrical device 300. FIG. 6 shows a support connector 311 arranged to provide electrically connectable surfaces adjacent to the conductor 201 on flange surface 205. Conductors 201 present in lower box 303 allow connection to electrical devices 300 from locations below ceiling grid framework 105. Although FIG. 6 shows the electrical connection to the electrical device being provided by the conductors 201 disposed on the lower flange surface 205, the electrical connection may take place using any combination of connectors that complete an electrical circuit to power electrical device 300.

Figure 7:
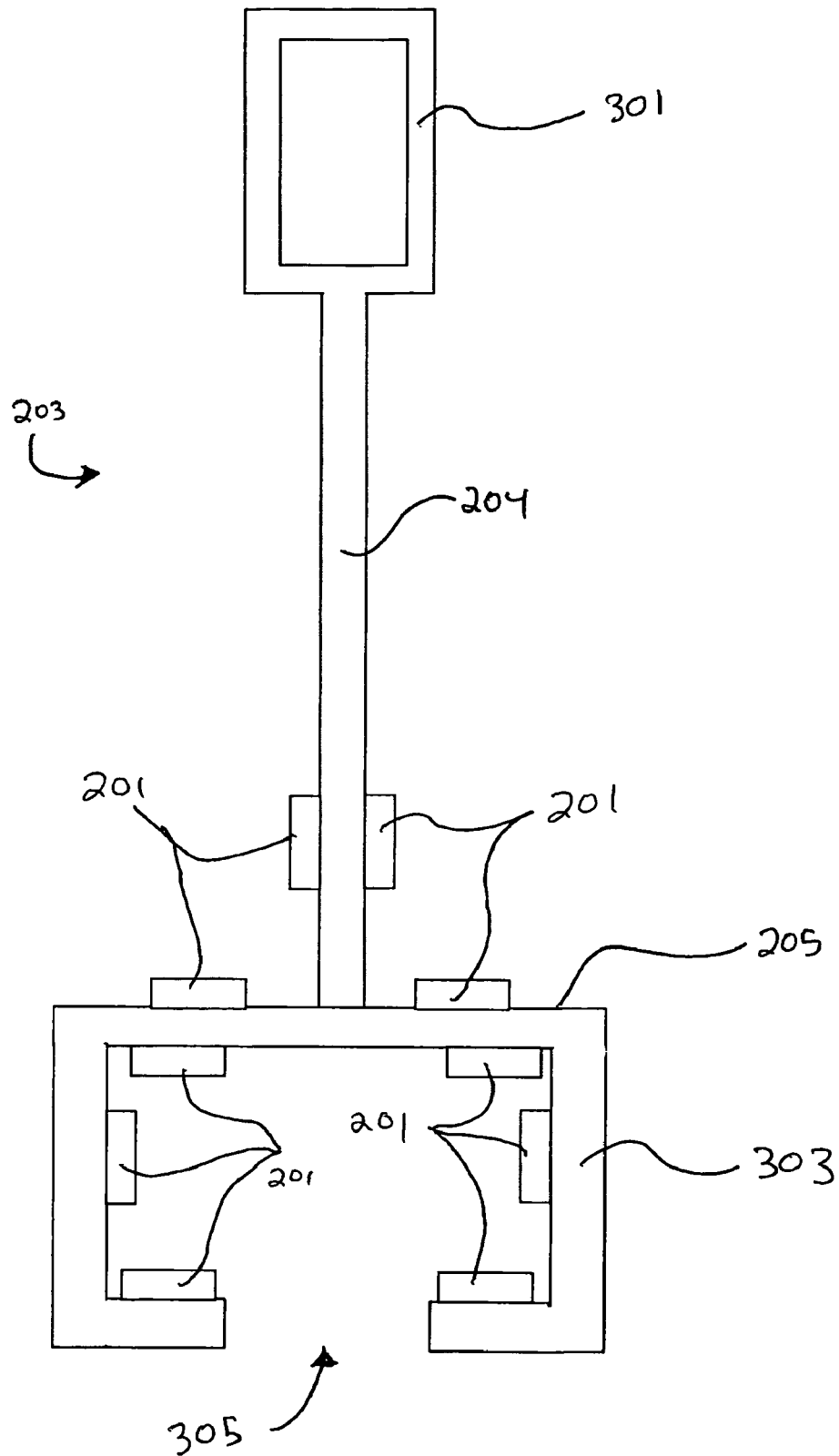
FIG. 7 shows cutaway elevational view of a support member and conductor arrangement according to another embodiment of the present invention.

FIG. 7 shows a cutaway view of a support member 203 according to an embodiment of the present invention. FIG. 7 illustrates ten locations for locating the conductors 201. While not limited to the arrangement shown in FIG. 7, the locations may be any combination of the locations shown in FIG. 7. Alternatively, the conductors 201 may be disposed on other surfaces of support member 203 in which connectability to electrical devices 300 is desirable.

FIG. 8 shows an example of ceiling grid framework 105 system according to an embodiment of the present invention. FIG. 8 shows a perspective view of a ceiling system, viewed from above, extending from a wall 801. The system includes a plurality of conductors 201 extending from wall 801 across the ceiling 103. Although not shown, the conductors 201 may be supported by support members, such as the support members 203 shown and described with respect to FIGS. 2-7. Although FIG. 8 shows the conductors 201 extending in a single direction extending from wall 801, the conductors 201 may be interconnected and/or included on the ceiling grid framework 105 arranged perpendicular to the conductors 201 shown. Additionally, the grid framework may extend through, over, around, under or within the wall structure itself.

Power is provided to conductors 201 from low voltage power sources such as, but not limited to, a transformer 803, or (not shown) photovoltaic or solar power generator, electrical fuel cell, combustion powered electrical generator, wind or water powered electrical generator, batteries or other electrical storage device, or any combination of these or other suitable power sources. In the case of a transformer as the power source, alternating line current (AC) is provided by a conventional power source 805 to low voltage transformer 803, wherein the voltage is converted to low voltage direct current (DC). The low voltage power is provided by power source 805 or other conducting means to conductors 201. Low voltage devices 107 are positioned on or near the ceiling grid framework 105.

Power is provided to the low voltage devices 107 by component connectors 309, which provide an electrical connection to conductors 201 and low voltage device 107. Suitable devices include, but are not limited to, light emitting diode (LED) lights, speakers, smoke or carbon monoxide detectors, wireless access points, still or video cameras, or other low voltage devices, may be mounted within, above or below ceiling 103. The ceiling grid framework 105 preferably includes a plurality of conductors 201 positioned on the support member 203 (not shown) in locations in which component connectors 309 may connect and provide power to the low voltage device 107. The conductors 201 preferably include a conductor 201 of a positive polarity, a conductor 201 of a negative polarity or a combination thereof. For example, the component connectors 309 may be positioned on opposite side of low voltage device 107 connecting to a conductor 201 of a positive polarity and a conductor 201 of a negative polarity, respectively, as shown as arrangement 807 in FIG. 8. In another example, devices, such as support connector 311 may be utilized to provide the connections on a single side of low voltage device 107, as shown in arrangements 809 and 811 in FIG. 8.

The present invention also includes a method of electrifying a ceiling grid system, wherein the method may be applied to new or existing ceiling system. The method includes providing a conductor 201 fabricated from a conductive material to a surface of a support member 203. The support member 203 may be provided with conductor 201 during fabrication of the support member 203 prior to installation or the conductor 201 may be provided to a surface of an existing, installed support member.

In the embodiment wherein the support member 203 is fabricated with the conductor 201 attached thereto, the ceiling 103 is erected in a conventional manner, including attaching and suspending the ceiling grid framework 105, the support members 203 and the conductors 201 to the structure of a building. After the ceiling grid framework 105 is installed, electrical connections including electrical connections to low voltage power sources may be made. The electrical connections may also include support connectors 311 to provide surface of opposite polarity in closer proximity to facilitate easier connection to low voltage devices 107. The electrical connections may also include component connectors 309, which provide power from the conductors 201 to low voltage devices 107. Additional connections may include junctions at the intersections of the ceiling grid framework 105 that may conduct electricity or selectively conduct electricity. By the simple inclusion of a common mechanical, electrical or electronic switching means, any electrical connections described herein may be made in such a way as to either passively conduct electricity or selectively conduct electricity. In addition, by the simple inclusion of a common electrical or electronic sensing and/or indicating means, any of the connections described herein may be made in such a way as to monitor, measure and/or otherwise indicate the electrical power condition at that point.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electrified ceiling framework system mounted in a room space, the system providing a barrier between a living space and a space for infrastructure systems, the system comprising:
   a plurality of grid elements arranged in a substantially horizontal plane and forming a grid network, at least one of the grid elements having a vertically extending web portion which is positioned in the space for infrastructure systems;
   first and second conductors are disposed contiguously on opposing sides of the vertically extending web portion; and
   wherein the first and second conductors each have an outer contact surface, the outer contact surfaces face away from one another and are each in contact with a low voltage power source which is positioned in the infrastructure systems space, the low voltage power source bringing electricity to the first and second conductors; and
   wherein the outer contact surfaces are in contact with an electrical device whereby the electricity is transferred from the first and second conductors to the electrical device.

2. The system of claim 1, wherein the grid elements are arranged and disposed to support the electrical device.

3. The system of claim 2, wherein the electrical device is selected from the group consisting of decorative devices, lighting devices, heating devices, cooling devices, sensing devices, control devices, communication devices, life safety and health maintenance devices, audio-visual devices and combinations thereof.

4. The system of claim 1, wherein the conductors are uncoated.

5. The system of claim 1, wherein the conductors are further coated with an electrically conductive material.

6. The system of claim 1, wherein the conductors are coated with a piercable electrically insulative material.

7. The system of claim 1, wherein the conductors are arranged as strips.

8. The system of claim 1, wherein the conductors are selected from the group consisting of aluminum, aluminum alloys, copper, copper alloys, brass, phosphor bronze, beryllium copper, stainless steel, and combinations thereof.

9. The system of claim 1, wherein the first conductor has a positive charge and the second conductor has a negative charge.

10. The system of claim 1, wherein the electrical device is positioned below the grid framework in the living space.

* * * * *